(12) United States Patent
Criner

(10) Patent No.: US 11,045,050 B2
(45) Date of Patent: Jun. 29, 2021

(54) ROASTING POST

(71) Applicant: Robert A. Criner, Rimersburg, PA (US)

(72) Inventor: Robert A. Criner, Rimersburg, PA (US)

( * ) Notice: Subject to any disclaimer, the term of this patent is extended or adjusted under 35 U.S.C. 154(b) by 103 days.

(21) Appl. No.: 15/976,430

(22) Filed: May 10, 2018

(65) Prior Publication Data
US 2019/0343332 A1 Nov. 14, 2019

(51) Int. Cl.
*A47J 37/07* (2006.01)

(52) U.S. Cl.
CPC .... *A47J 37/0786* (2013.01); *A47J 2037/0795* (2013.01)

(58) Field of Classification Search
CPC ............... A47J 37/0786; A47J 2037/0795
USPC .......................................................... 126/30
See application file for complete search history.

(56) References Cited

U.S. PATENT DOCUMENTS

| | | | | |
|---|---|---|---|---|
| 1,384,250 A * | 7/1921 | Froom | ............... | A47J 33/00 126/30 |
| 2,522,223 A * | 9/1950 | Hardin | ............... | A47J 37/0763 248/124.2 |
| 4,083,354 A * | 4/1978 | Claire | ............... | A47J 37/0772 126/25 A |
| 4,320,700 A * | 3/1982 | Stachowicz | ......... | A47J 37/0786 126/30 |
| 5,307,797 A * | 5/1994 | Kleefeld | ............... | A47J 33/00 126/30 |
| 7,004,160 B1 * | 2/2006 | Bates | ............... | A47J 33/00 126/30 |
| 2008/0168976 A1 * | 7/2008 | Simsack | ............... | A47J 33/00 126/30 |

* cited by examiner

*Primary Examiner* — Avinash A Savani
(74) *Attorney, Agent, or Firm* — Jonathan M. D'Silva; MMI Intellectual Property

(57) ABSTRACT

A roasting post comprises a rod having a first end and a second end. The first end is configured to be inserted into the ground. A brace perpendicular to the rod is located at or near the second end. The brace comprises at least one counterbalance hook configured to receive a skewer such that the skewer is held substantially perpendicular to the ground while any food items on the skewer are held over a fire.

3 Claims, 2 Drawing Sheets

ROASTING POST

BACKGROUND

Outdoor activities such as camping often include a cook-out over an open fire that includes roasting marshmallows, hot dogs, or other food items held on a skewer by a user. This can be a tiresome affair, particularly so with food items that take a longer time to cook than a marshmallow. What is presented is a roasting post that counterbalances a skewer against a brace to hold the food on the skewer in place so that a user does not have to be holding the skewer for long periods of time.

SUMMARY

What is presented is a roasting post comprising a rod having a first end and a second end. The first end is configured to be inserted into the ground. A brace perpendicular to the rod is located at or near the second end. The brace comprises at least one counterbalance hook configured to receive a skewer such that the skewer is held substantially perpendicular to the ground while any food items on the skewer are held over a fire. The first end could be pointed to facilitate its insertion into the ground. A steel disk may be welded near the first end to stabilize the rod when it's inserted into the ground.

In some embodiments, the brace could have two counter balance hooks so that the orientation of the skewer is immaterial. In other embodiments, the second end of the roasting post is threaded to receive the brace. The brace may be secured to the rod with a wingnut or bolt. The brace may further comprise an adjustment hole to adjust the location of the counterbalance hooks and thereby the perpendicular alignment the skewer over the fire.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
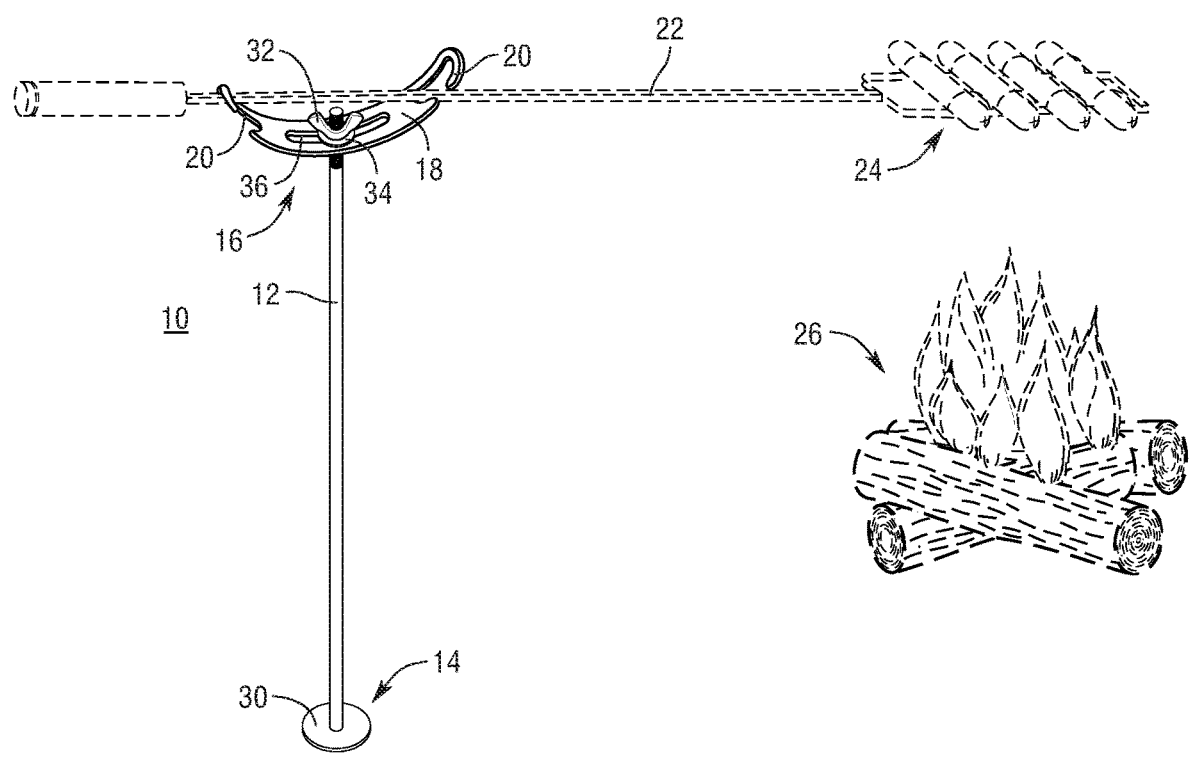
FIG. 1 shows a roasting post with a skewer in use.

Campfires are an iconic way to experience the outdoors and there is nothing like cooking a meal over an open fire to connect a person to the outdoors. Food items are often skewered onto the end of skewers, sticks, or poles (collectively "skewers") and held such that the food is placed at some distance over the flames. The skewers have one end that is held by a user and an opposite end that may be straight poles, fork tined, or some other device that holds food over the flame. Regardless, a person must hold the skewer over the fire for as long as wanted to cook the food item. This can take some time and could be tiring. Further the person can't easily step away from the fire without moving the food away as well and losing cooking time.

As shown in the figures, what is presented is a roasting post 10 comprising a rod 12 having a first end 14 and a second end 16. The first end 14 is configured to be inserted into the ground. A brace 18 perpendicular to the rod 12 is located at or near the second end 16. The brace 18 comprises at least one counterbalance hook 20 configured to receive a skewer 22 such that the skewer 22 is held substantially perpendicular to the ground while any food items 24 on the skewer 22 are held over a fire 26.

Figure 2:
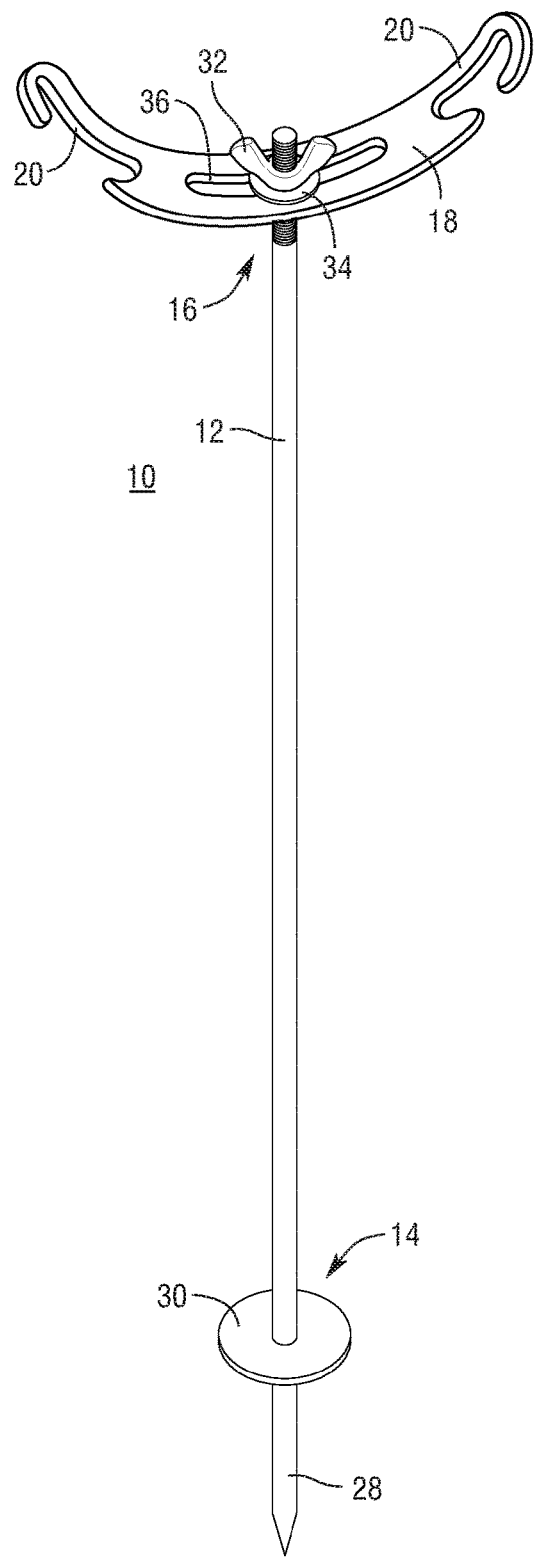
FIG. 2 shows a perspective view of the roasting post shown in FIG. 1.
Figure 3:
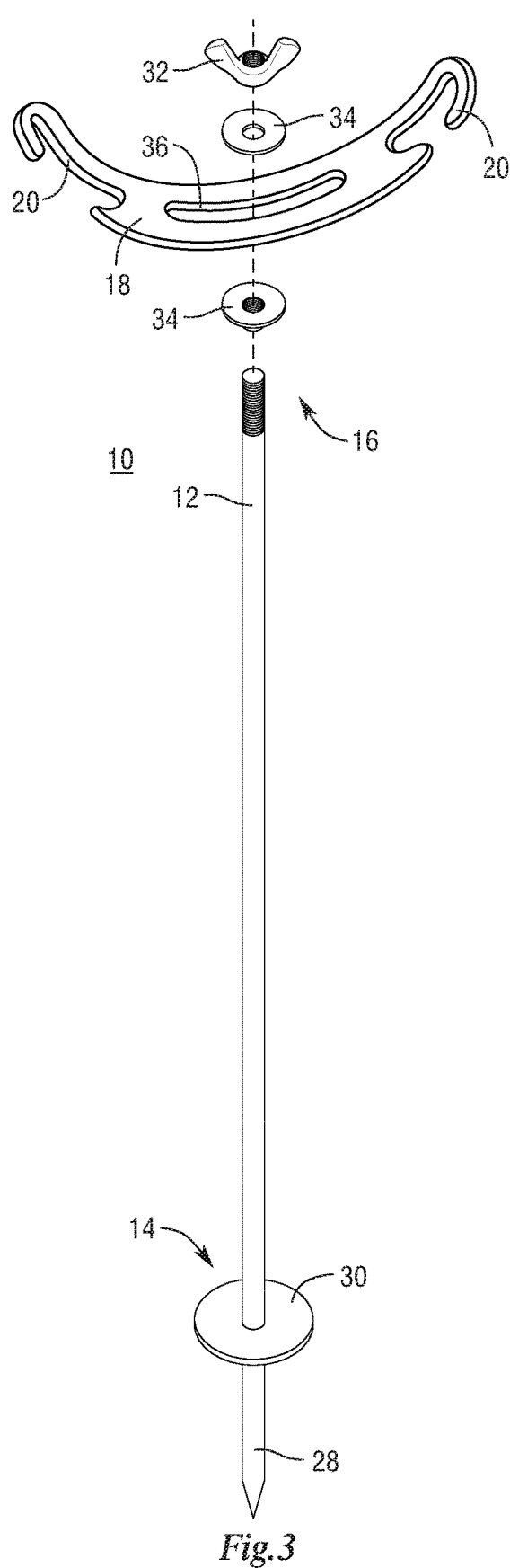
FIG. 3 shows an exploded view of the roasting post shown in FIG. 2.

As shown in FIGS. 2 and 3, the first end 14 of the roasting post 10 may be pointed 28 to facilitate its insertion into the ground, but it may be a screw or other device that makes it easier to drive the post into the ground. An optional steel disk 30 may be welded near the first end 14 to stabilize the rod 12 when the first end 14 is inserted into the ground.

The second end 16 of the roasting post 10 may be threaded to receive the brace 18 and secure it to the rod 12. The figures show that the brace 18 is secured to the rod 12 with a wingnut 32 between two washers 34. However, it will be understood that devices other than a wingnut, such as a bolt may be used. In some embodiments not shown, the brace 18 may instead be welded to the rod 12.

A user locates the roasting post 10 close enough to the fire 26 for the skewer 22 to hold the food items 24 over the flames. The rod 12 is inserted into the ground by pushing the first end 16 up to the steel disk 30 (if present). As shown in FIG. 1, the skewer 22 is inserted into one of the counterbalance hooks 20 of the brace 18 and positioned such that the skewer 22 is counterbalanced against the brace 18 so that the food items 24 stay over the fire 26. The user may then release the skewer 22 and allow the roasting post 20 to hold the skewer 22 in place with little to no intervention other than to rotate the skewer 22 as needed to properly cook the food items 24. The roasting post 10 shown in the figures has two counterbalance hooks 20, but as can be seen in FIG. 1, only one hook is necessary to receive and support the skewer 22. An adjustment hole 36 may be incorporated into the brace 18 to allow adjustment of the location of the counterbalance hooks 30 and thereby the perpendicular alignment the skewer 22 over the fire 26. The adjustment hole 36 would not be feasible in those embodiments in which the brace 18 is welded to the rod 12.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A roasting post comprising: a rod having a first end and a threaded second end, said first end configured to be inserted into the ground; a curved brace perpendicular to said rod and located at or near said second end; said brace comprising counterbalance hooks configured to receive a skewer such that the skewer may be slidably displaced and rotated within said at least one counterbalance hook and is held substantially perpendicular to the ground while any food items on the skewer are held over a fire; the counterbalance hooks located on opposite ends of the brace and facing the same direction and said brace further comprising an adjustment hole to adjust the horizontal location of said at least one counterbalance hook and thereby the perpendicular alignment of the skewer with respect to the rod, the brace is secured on the threaded end of the rod and secured by two washers and a wingnut, which allows for the adjustment of the brace.

2. The roasting post of claim 1 in which said first end is pointed.

3. The roasting post of claim 1 in which a steel disk is welded near said first end to stabilize said rod when said first end is inserted into the ground.

* * * * *